United States Patent
He et al.

(10) Patent No.: US 8,922,695 B2
(45) Date of Patent: Dec. 30, 2014

(54) IMAGE PROCESSING METHOD AND APPARATUS

(71) Applicant: Huawei Technologies Co., Ltd., Shenzhen (CN)

(72) Inventors: Zhen He, Shenzhen (CN); Jilin Liu, Shenzhen (CN); Yang Liu, Beijing (CN); Tengyue Li, Shenzhen (CN); Dong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/140,782

(22) Filed: Dec. 26, 2013

(65) Prior Publication Data

US 2014/0192212 A1    Jul. 10, 2014

Related U.S. Application Data

(63) Continuation of application No. PCT/CN2013/080974, filed on Aug. 7, 2013.

(51) Int. Cl.
  *H04N 5/222*  (2006.01)
  *H04N 5/228*  (2006.01)
  *H04N 5/232*  (2006.01)

(52) U.S. Cl.
  CPC .................. *H04N 5/23238* (2013.01)
  USPC ..................... 348/333.05; 348/222.1

(58) Field of Classification Search
  CPC .................................................. H04N 5/2622
  See application file for complete search history.

(56) References Cited

U.S. PATENT DOCUMENTS 7,352,393 B2 *   4/2008   Sakamoto ................. 348/239
2005/0036044 A1 *  2/2005   Funakura ................. 348/239

(Continued)

FOREIGN PATENT DOCUMENTS

CN   1878241 A   12/2006
CN   101841662 A   9/2010

(Continued)

OTHER PUBLICATIONS

Foreign Communication From a Counterpart Application, PCT Application No. PCT/CN2013/080974, Chinese Search Report dated Nov. 21, 2013, 8 pages.

(Continued)

*Primary Examiner* — Jason Flohre
(74) *Attorney, Agent, or Firm* — Conley Rose, P.C.; Grant Rodolph; Nicholas K. Beaulieu

(57) ABSTRACT

Embodiments of the present invention disclose an image processing method and an apparatus. The image processing method includes: receiving information of starting a first camera and a second camera simultaneously to perform photographing; using the first camera to photograph and obtain a first image, and using the second camera to photograph and obtain a second image; and displaying the first image and the second image simultaneously. In the embodiments of the present invention, two cameras are started simultaneously to perform bidirectional photographing, and the images taken by both cameras are displayed simultaneously, so that front and back scene images are captured simultaneously and a panoramic image is obtained.

26 Claims, 12 Drawing Sheets

(56) References Cited

U.S. PATENT DOCUMENTS

| | | |
|---|---|---|
| 2005/0134718 A1* | 6/2005 | Honda .................... 348/333.06 |
| 2009/0201424 A1* | 8/2009 | Ueda ............................ 348/565 |
| 2011/0058053 A1 | 3/2011 | Roh |
| 2011/0134141 A1* | 6/2011 | Swanson et al. .............. 345/634 |
| 2012/0092529 A1* | 4/2012 | Choi et al. .................... 348/239 |
| 2012/0105579 A1 | 5/2012 | Jeon et al. |
| 2012/0162393 A1 | 6/2012 | Okegawa et al. |
| 2012/0188408 A1* | 7/2012 | Nakaoka ................. 348/231.99 |
| 2012/0196649 A1* | 8/2012 | Havens et al. ............. 455/556.1 |
| 2013/0314561 A1* | 11/2013 | Balannik et al. ........... 348/222.1 |

FOREIGN PATENT DOCUMENTS

| | | |
|---|---|---|
| CN | 102055834 A | 5/2011 |
| CN | 102185965 A | 9/2011 |
| CN | 102495460 A | 6/2012 |

OTHER PUBLICATIONS

Foreign Communication From a Counterpart Application, PCT Application No. PCT/CN2013/080974, Chinese Written Opinion dated Nov. 21, 2013, 7 pages.

* cited by examiner

IMAGE PROCESSING METHOD AND APPARATUS

CROSS-REFERENCE TO RELATED APPLICATIONS

This application is a continuation of International Application No. PCT/CN2013/080974, filed on Aug. 7, 2013, which claims priority to Chinese Patent Application No. 201310004832.6, filed on Jan. 7, 2013, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of image processing technologies, and in particular, to an image processing method and an apparatus.

BACKGROUND

With popularization of photographing devices such as digital cameras and digital video cameras, and integration of a photographing apparatus and a portable device, such as a mobile phone or PAD that has a built-in camera, people begin to use the photographing devices or the portable device to take images and record videos more and more frequently.

However, a photographing apparatus on a traditional photographing device or portable device can only perform separate foreground or background photographing, and can hardly capture and display both front and back scenes simultaneously.

In the prior art, fast switching can be performed between a front camera and a rear camera on the device, and photographing of the front and back scenes can be implemented with timely switching, so that front-and-back 180-degree scenes can be captured quickly. However, this method still cannot implement simultaneous capturing of front and back scene images.

SUMMARY

Embodiments of the present invention provide an image processing method and an apparatus, which can implement simultaneous capturing of front and back scene images.

To solve the above technical problem, the embodiments of the present invention disclose the following technical solutions:

In a first aspect, an image processing method is provided, where the method includes: receiving information of starting a first camera and a second camera simultaneously to perform photographing; using the first camera to photograph and obtain a first image, and using the second camera to photograph and obtain a second image; and displaying the first image and the second image simultaneously.

With reference to the first aspect, in a first possible implementation manner, the using the first camera to photograph and obtain a first image includes: obtaining a first focusing parameter of the first camera; and using the first camera to photograph according to the first focusing parameter to obtain the first image.

With reference to the first aspect and/or the first possible implementation manner, in a second possible implementation manner, the obtaining a first focusing parameter of the first camera includes: using the first camera to obtain a preview image of the first image; and determining the first focusing parameter of the first camera according to an operation of adjusting a focus for the preview image of the first image.

With reference to the first aspect and/or the first possible implementation manner and/or the second possible implementation manner, in a third possible implementation manner, the displaying the first image and the second image simultaneously includes: determining a specified display area of the second image in the first image; and displaying the second image in the specified display area of the first image.

With reference to the first aspect and/or the first possible implementation manner and/or the second possible implementation manner and/or the third possible implementation manner, in a fourth possible implementation manner, the determining a specified display area of the second image in the first image includes: determining a prominent area and a non-prominent area in the first image according to a preset algorithm; and using the non-prominent area in the first image as the specified display area of the second image in the first image.

With reference to the first aspect and/or the first possible implementation manner and/or the second possible implementation manner and/or the third possible implementation manner and/or the fourth possible implementation manner, in a fifth possible implementation manner, after the displaying the first image and the second image simultaneously, the method further includes: obtaining a drag locus of the second image; and determining a display position of the second image according to the drag locus.

With reference to the first aspect and/or the first possible implementation manner and/or the second possible implementation manner and/or the third possible implementation manner and/or the fourth possible implementation manner and/or the fifth possible implementation manner, in a sixth possible implementation manner, after the displaying the first image and the second image simultaneously, the method further includes: obtaining information about switching operations on display areas of the first image and the second image; and exchanging the display areas of the first image and the second image according to the information about the switching operations.

With reference to the first aspect and/or the first possible implementation manner and/or the second possible implementation manner and/or the third possible implementation manner and/or the fourth possible implementation manner and/or the fifth possible implementation manner and/or the sixth possible implementation manner, in a seventh possible implementation manner, after the displaying the first image and the second image simultaneously, the method further includes: obtaining similarity between an edge area of the second image and a position that accommodates the second image in the first image; and synthesizing the second image with the first image if the similarity is greater than or equal to a threshold.

With reference to the first aspect and/or the first possible implementation manner and/or the second possible implementation manner and/or the third possible implementation manner and/or the fourth possible implementation manner and/or the fifth possible implementation manner and/or the sixth possible implementation manner and/or the seventh possible implementation manner, in an eighth possible implementation manner, the method further includes: adjusting the first image and/or the second image to increase the similarity if the similarity is smaller than the threshold.

In a second aspect, an image processing method is provided, where the method is applied to a terminal that has a panoramic auxiliary lens and at least one camera, where the panoramic auxiliary lens is used to reflect or refract a surrounding view of the terminal to a photographing area of the camera, and the method includes: receiving the view reflected or refracted by the panoramic auxiliary lens; using the camera to photograph the view reflected or refracted by the panoramic auxiliary lens to obtain an image; and displaying the image obtained by photographing.

With reference to the second aspect, in a first possible implementation manner, the using the camera to photograph the view reflected or refracted by the panoramic auxiliary lens to obtain an image includes: using the camera to obtain a preview image of the view reflected or refracted by the panoramic auxiliary lens, where the preview image includes multiple preview sub-images from different angles; determining a focusing parameter of the camera according to an operation of adjusting a focus for any preview sub-image of the multiple preview sub-images; and according to the focusing parameter, using the camera to photograph the view reflected or refracted by the panoramic auxiliary lens to obtain an image.

With reference to the second aspect and/or the first possible implementation manner, in a second possible implementation manner, the displaying the image obtained by photographing includes: displaying the image obtained by photographing continuously in a planar expansion manner; or displaying the image obtained by photographing continuously in an annular display manner; or dividing the image obtained by photographing into multiple images from different angles, and displaying the multiple images from different angles simultaneously.

With reference to the second aspect and/or the first possible implementation manner and/or the second possible implementation manner, in a third possible implementation manner, after the displaying the image obtained by photographing, the method further includes: cropping the image obtained by photographing according to a set scale; and saving the cropped image.

In a third aspect, an image processing apparatus is provided, where the method includes: an information receiving unit configured to receive information of starting a first camera and a second camera simultaneously to perform photographing; an image obtaining unit configured to use the first camera to photograph and obtain a first image, and use the second camera to photograph and obtain a second image; and an image outputting unit configured to display the first image and the second image simultaneously.

With reference to the third aspect, in a first possible implementation manner, the image obtaining unit includes: a parameter obtaining subunit configured to obtain a first focusing parameter of the first camera and a second focusing parameter of the second camera; and an image obtaining subunit configured to use the first camera to photograph according to the first focusing parameter to obtain the first image, and use the second camera to photograph according to the second focusing parameter to obtain the second image.

With reference to the third aspect and/or the first possible implementation manner, in a second possible implementation manner, the parameter obtaining subunit includes: a first subunit configured to use the first camera to obtain a preview image of the first image; and a second subunit configured to determine the first focusing parameter of the first camera according to an operation of adjusting a focus for the preview image of the first image.

With reference to the third aspect and/or the first possible implementation manner and/or the second possible implementation manner, in a third possible implementation manner, the image outputting unit includes: an area determining subunit configured to determine a specified display area of the second image in the first image; and an outputting subunit configured to display the second image in the specified display area of the first image.

With reference to the third aspect and/or the first possible implementation manner and/or the second possible implementation manner and/or the third possible implementation manner, in a fourth possible implementation manner, the area determining subunit includes: a third subunit configured to determine a prominent area and a non-prominent area in the first image according to a preset algorithm; and a fourth subunit configured to use the non-prominent area in the first image as the specified display area of the second image in the first image.

With reference to the third aspect and/or the first possible implementation manner and/or the second possible implementation manner and/or the third possible implementation manner and/or the fourth possible implementation manner, in a fifth possible implementation manner, the apparatus further includes: a locus obtaining unit configured to obtain a drag locus of the second image; and a position determining unit configured to determine a display position of the second image according to the drag locus.

With reference to the third aspect and/or the first possible implementation manner and/or the second possible implementation manner and/or the third possible implementation manner and/or the fourth possible implementation manner and/or the fifth possible implementation manner, in a sixth possible implementation manner, the apparatus further includes: an information obtaining unit configured to obtain information about switching operations on display areas of the first image and the second image; and a switching unit configured to exchange the display areas of the first image and the second image according to the information about the switching operations.

With reference to the third aspect and/or the first possible implementation manner and/or the second possible implementation manner and/or the third possible implementation manner and/or the fourth possible implementation manner and/or the fifth possible implementation manner and/or the sixth possible implementation manner, in a seventh possible implementation manner, the apparatus further includes: a calculating unit configured to obtain similarity between an edge area of the second image and a position that accommodates the second image in the first image; a synthesizing unit configured to synthesize the second image with the first image if the similarity is greater than or equal to a threshold; and an adjusting unit configured to adjust the first image and/or the second image to increase the similarity if the similarity is smaller than the threshold.

In a fourth aspect, an image processing apparatus is provided, where the apparatus is applied to a terminal that has a panoramic auxiliary lens and at least one camera, where the panoramic auxiliary lens is used to reflect or refract a surrounding view of the terminal to a photographing area of the camera, and the apparatus includes: a view receiving unit configured to receive the view reflected or refracted by the panoramic auxiliary lens; an image obtaining unit configured to use the camera to photograph the view reflected or refracted by the panoramic auxiliary lens to obtain an image; and an image outputting unit configured to display the image obtained by photographing.

With reference to the fourth aspect, in a first possible implementation manner, the image obtaining unit includes: a preview subunit configured to use the camera to obtain a preview image of the view reflected or refracted by the panoramic auxiliary lens, where the preview image includes multiple preview sub-images from different angles; a parameter determining subunit configured to determine a focusing parameter of the camera according to an operation of adjusting the focus for any preview sub-image of the multiple preview sub-images; and an obtaining subunit configured to: according to the focusing parameter, use the camera to photograph the view reflected or refracted by the panoramic auxiliary lens to obtain an image.

With reference to the fourth aspect and/or the first possible implementation manner, in a second possible implementation manner, the image outputting unit is specifically configured to: display the image obtained by photographing continuously in a planar expansion manner; or display the image obtained by photographing continuously in an annular display manner; or divide the image obtained by photographing into multiple images from different angles, and display the multiple images from different angles simultaneously.

With reference to the fourth aspect and/or the first possible implementation manner and/or the second possible implementation manner, in a third possible implementation manner, the apparatus further includes: a cropping unit configured to crop the image obtained by photographing according to a set scale; and a saving unit configured to save the cropped image.

In a fifth aspect, a terminal is provided, which includes a processor, a display, a memory, a first camera, and a second camera, where the processor is configured to control working states of the first camera and the second camera, the processor is connected to the display and the memory respectively, the memory stores a set of program codes, and the processor is configured to call the program codes stored in the memory to execute the following operations: receiving information of starting a first camera and a second camera simultaneously to perform photographing; using the first camera to photograph and obtain a first image, and using the second camera to photograph and obtain a second image; and the display is configured to display the first image and the second image simultaneously.

In a sixth aspect, a terminal is provided, which includes a processor, a display, a memory, a panoramic auxiliary lens, and at least one camera, where the processor is configured to control a working state of the camera, the panoramic auxiliary lens is configured to reflect or refract a surrounding view of the terminal to a photographing area of the camera, the processor is connected to the display and the memory respectively, the memory stores a set of program codes, and the processor is configured to call the program codes stored in the memory to execute the following operations: receiving the view reflected or refracted by the panoramic auxiliary lens; and using the camera to photograph the view reflected or refracted by the panoramic auxiliary lens to obtain an image; and the display is configured to display the image obtained by photographing.

With reference to the sixth aspect, in a first possible implementation manner, the panoramic auxiliary lens is located on top of the terminal and connected resiliently to the top of the terminal, and, while working, the panoramic auxiliary lens are in an pop-up state to reflect or refract a surrounding view of the terminal to a photographing area of the camera.

In the embodiments of the present invention, two cameras are started simultaneously to perform bidirectional photographing, and the images taken by both cameras are displayed simultaneously, so that front and back scene images are captured simultaneously and a panoramic image is obtained.

BRIEF DESCRIPTION OF THE DRAWINGS

To describe the technical solutions in the embodiments of the present invention more clearly, the following briefly introduces the accompanying drawings required for describing the embodiments. A person of ordinary skill in the art may still derive other drawings from these accompanying drawings without creative efforts.

DETAILED DESCRIPTION

To enable persons skilled in the art to better understand the technical solutions in the embodiments of the present invention and make the above objectives, characteristics, and advantages of the present invention more comprehensible, the following describes the technical solutions of the present invention in more detail with reference to accompanying drawings.

Figure 1:
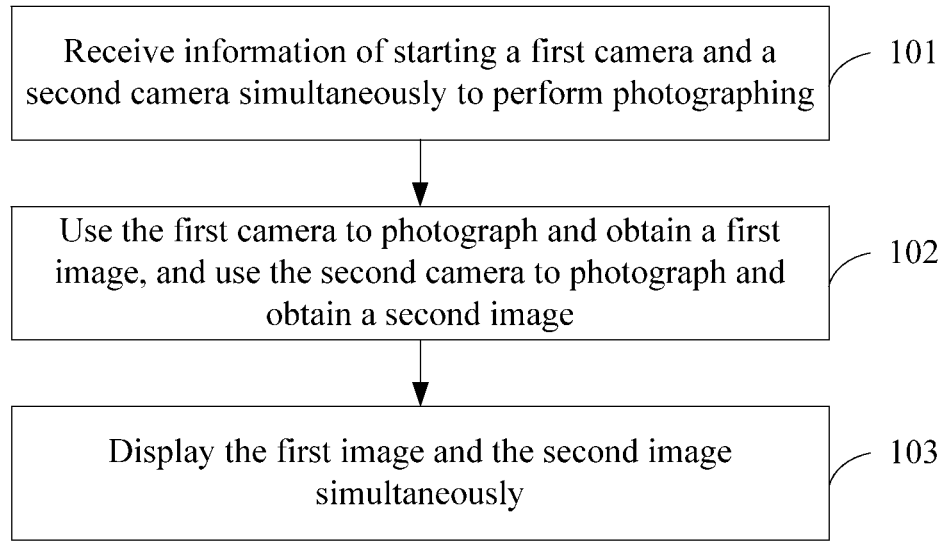
FIG. 1 is a flowchart of an image processing method according to an embodiment of the present invention.

Referring to FIG. 1, FIG. 1 is a flowchart of an image processing method according to an embodiment of the present invention.

The method may include:

Step 101: Receive information of starting a first camera and a second camera simultaneously to perform photographing.

In this embodiment, a terminal, such as a mobile phone or PAD, includes at least a first camera and a second camera, where the first camera may be either a front camera or a rear camera in a photographing apparatus, and the second camera may be the other of the front camera and the rear camera; the front camera is a camera located on the same side as an operation interface of the photographing apparatus, and the rear camera is a camera located on the rear side of the operation interface of the photographing apparatus. Nevertheless, the first camera and the second camera may be cameras in other positions, and are only examples herein.

Depending on default settings, the terminal may start a bidirectional photographing function automatically when a user starts a photographing application, that is, the terminal receives information of starting the first camera and the second camera simultaneously to perform photographing; or, when the user starts the photographing application, the terminal displays a variety of option information to the user, for example, the information of starting the first camera, starting the second camera, and starting bidirectional photographing, and the like. According to the user's operation of selecting the information of starting the bidirectional photographing, the terminal receives the information of starting the first camera and the second camera simultaneously to perform photographing.

Step 102: Use the first camera to photograph and obtain a first image, and use the second camera to photograph and obtain a second image.

In the embodiment of the present invention, a control circuit of the first camera and a control circuit of the second camera may be in working states simultaneously. An imaging system of the first camera may also be independent of an imaging system of the second camera, and therefore, after receiving information of activating the first camera and the second camera simultaneously, the terminal can use the first camera to photograph and obtain the first image and use the second camera to photograph and obtain the second image.

Step 103: Display the first image and the second image simultaneously.

After the terminal obtains the first image and the second image simultaneously, the first image and the second image may be displayed on a display screen simultaneously. Specifically, the display screen may be divided into areas, a first image display area displays the first image, and a second image display area displays the second image; or, the first image is displayed in full screen, and the second image is displayed in a certain area of the first image at the same time, that is, picture-in-picture display is implemented. There are multiple display manners, which are not described here exhaustively.

In the embodiment of the present invention, two cameras are started simultaneously to perform bidirectional photographing, and images taken by both cameras are displayed simultaneously, so that front and back scene images are captured simultaneously and a panoramic image is obtained.

Figure 2:
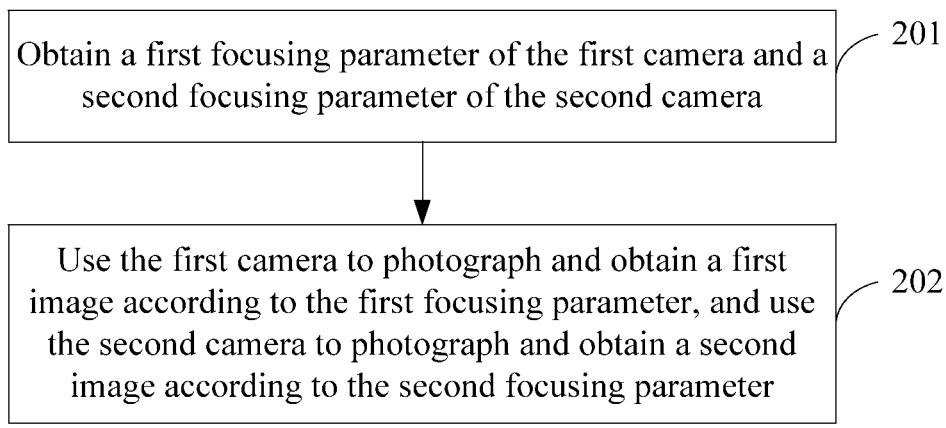
FIG. 2 is a flowchart of a method for obtaining a first image and a second image according to an embodiment of the present invention.

In another embodiment of the present invention, when a first camera is used to photograph and obtain a first image and a second camera is used to photograph and obtain a second image, as shown in FIG. 2, the process may include the following steps:

Step 201: Obtain a first focusing parameter of the first camera and a second focusing parameter of the second camera.

Taking the first focusing parameter as an example, the first focusing parameter may be a focusing parameter obtained by the first camera in a default automatic focusing manner; or may be a focusing parameter input by the user manually and obtained by the terminal after the user inputs the parameter manually or adjusts a focus manually. The second focusing parameter is similar to the first focus parameter, and details are not described herein again.

Figure 3:
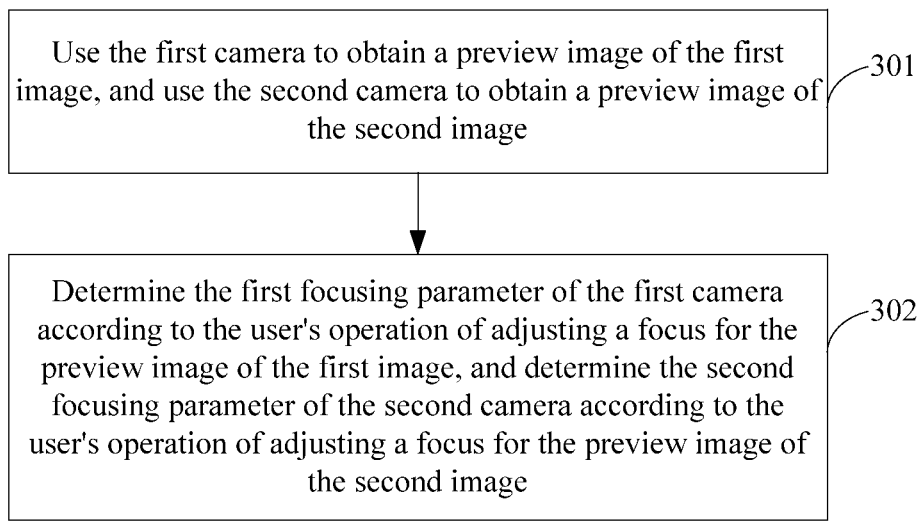
FIG. 3 is a flowchart of a method for obtaining a focusing parameter input by a user manually according to an embodiment of the present invention.

As shown in FIG. 3, the manner of obtaining, by the terminal, a focusing parameter input by a user manually may include the following steps:

Step 301: Use the first camera to obtain a preview image of the first image, and use the second camera to obtain a preview image of the second image.

The preview image of the first image and the preview image of the second image may be displayed in separate areas simultaneously; or, the preview image of the first image is displayed in full screen, and the preview image of the second image is displayed in a certain area in the preview image of the first image.

Step 302: Determine the first focusing parameter of the first camera according to the user's operation of adjusting a focus for the preview image of the first image, and determine the second focusing parameter of the second camera according to the user's operation of adjusting a focus for the preview image of the second image.

The user may directly touch the screen to adjust the focus for the preview image of the first image and the preview image of the second image respectively. When the preview image of the first image is displayed in full screen and the preview image of the second image is displayed in a certain area in the preview image of the first image, in order to facilitate the user's operation of adjusting the focus for the preview image of the second image, after the user adjusts the focus for the preview image of the first image, the user may perform a sliding operation on the display screen, and, after identifying the sliding operation, the terminal exchanges the display mode of the preview image of the first image with the display mode of the preview image of the second image, that is, displays the preview image of the second image in full screen and displays the preview image of the first image in a certain area in the preview image of the second image, and then the terminal determines a second focusing parameter of the second camera according to the user's operation of adjusting the focus for the preview image of the second image.

Step 202: Use the first camera to photograph and obtain a first image according to the first focusing parameter, and use the second camera to photograph and obtain a second image according to the second focusing parameter.

Figure 4:
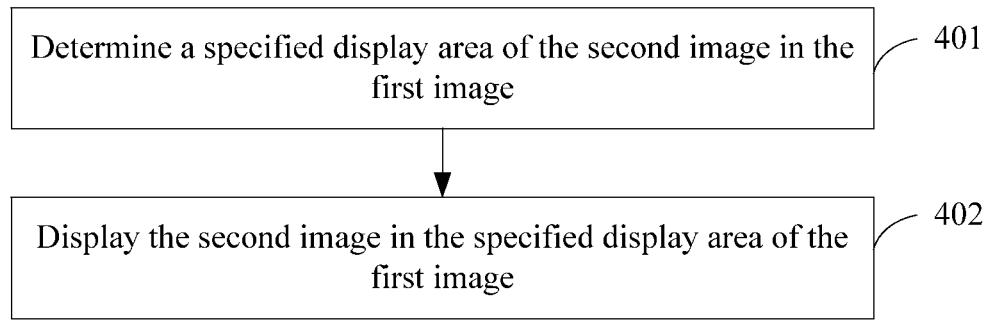
FIG. 4 is a flowchart of a method for displaying a first image and a second image simultaneously according to an embodiment of the present invention.

In another embodiment of the present invention, when the first image and the second image are displayed simultaneously, one of the specific implementation manners is: displaying the first image, and displaying the second image in a specified display area of the first image. As shown in FIG. 4, the displaying process may specifically include the following steps:

Step 401: Determine a specified display area of the second image in the first image.

The process of determining the specified display area may specifically include:

1) Determining a Prominent Area and a Non-Prominent Area in the First Image According to a Preset Algorithm.

The preset algorithm may be an existing algorithm, or a space-based distribution algorithm, or a human-face-based distribution algorithm, or an edge-based distribution algorithm, or the like. For example:

Manner 1: Space-Based Distribution Algorithm

Figures 5, 6:
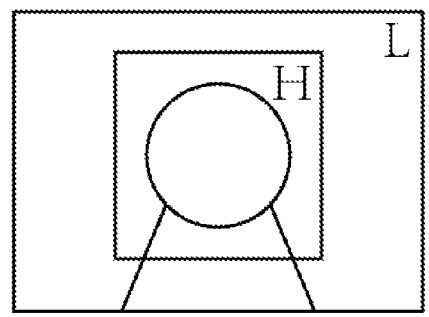
FIG. 5 is a schematic diagram of spatial distribution in an embodiment shown in FIG. 4.
FIG. 6 is a schematic diagram of human face distribution in an embodiment shown in FIG. 4.

First, a prominent area, a medium-level area, and a non-prominent area of the first image are determined. If the first image is displayed in full screen, the prominent area, the medium-level area, and the non-prominent area of the display screen may be determined. As shown in FIG. 5, the display area of the display screen may be divided into 3×3 panes, the central area is a prominent area, the area outside the central area may be divided into a medium-level area and a non-prominent area according to the extent of attracting attention of human eyes, where H represents a prominent area, M represents a medium-level area, and L represents a non-prominent area. The specified display area may be the medium-level area or the non-prominent area. When being displayed, the second image may be displayed in the M area or the L area.

Manner 2: Human Face-Based Distribution Algorithm

First, a human face image of the user is obtained by using the camera, and then the area of the human face image is classified as a prominent area (H), and the remaining area is classified as a non-prominent area (L), as shown in FIG. 6. The specified display area may be the non-prominent area. If the first image is displayed in full screen, the second image may be located in the non-prominent area.

Manner 3: edge-based distribution algorithm

Figure 7:
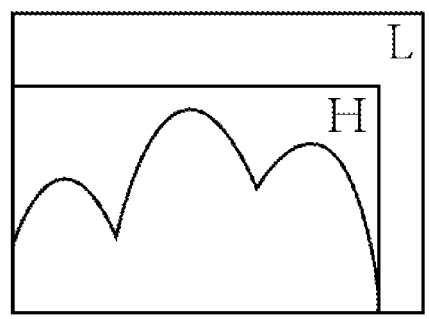
FIG. 7 is a schematic diagram of edge distribution in an embodiment shown in FIG. 4.

First, a prominent area (H) and an edge area (L) are determined based on the edge-based distribution algorithm, as shown in FIG. 7. The specified display area may be the edge area. If the first image is displayed in full screen, the second image may be located in the edge area.

Manner 4: The specified display area may be preset. The size and the shape of the specified display area may be preset as required and may also be adjusted when displayed.

2) Using the Non-Prominent Area in the First Image as the Specified Display Area of the Second Image in the First Image.

Step 402: Display the second image in the specified display area of the first image.

Figure 8:
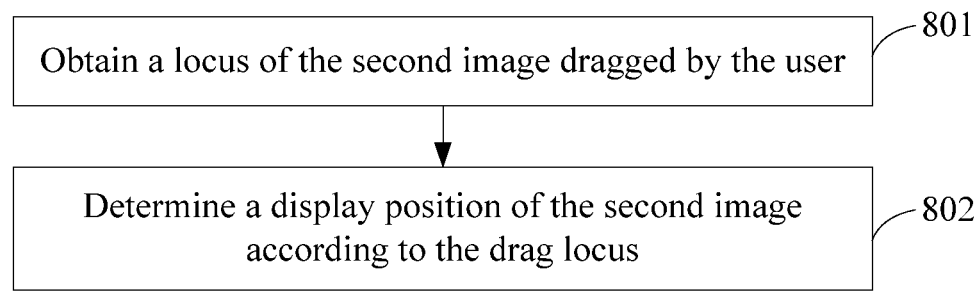
FIG. 8 is a flowchart of a method for determining a position of a second image according to an embodiment of the present invention.

In another embodiment of the present invention, after the second image is displayed in the specified display area of the first image, as shown in FIG. 8, the method may further include:

Step 801: Obtain a locus of the second image dragged by the user.

If the user needs to adjust a display position of the second image, the user may tap the second image, and drag the second image in the display screen, and the terminal determines the drag operation information of the second image according to the tap and drag operations performed by the user on the second image, and then can obtain the user's drag locus according to the position where the user's finger taps the screen.

Step 802: Determine a display position of the second image according to the drag locus.

After determining the drag locus, the terminal may display the second image according to the drag locus.

Figure 9:
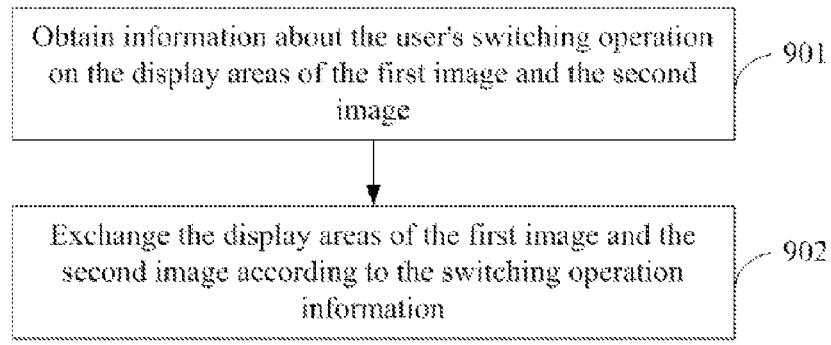
FIG. 9 is a flowchart of a method for switching display areas of a first image and a second image according to an embodiment of the present invention.

In another embodiment of the present invention, after the second image is displayed in the specified display area of the first image, as shown in FIG. 9, the method may further include the following steps:

Step 901: Obtain information about the user's switching operation on the display areas of the first image and the second image.

The switching operation information may specifically be the user's sliding operation between the first image and the second image, or the user's continuous tap operation on the first image and the second image, or the like.

Step 902: Exchange the display areas of the first image and the second image according to the switching operation information.

After the exchange, the first image is displayed in the specified display area of the second image, and the second image may be displayed in full screen.

Figure 10:
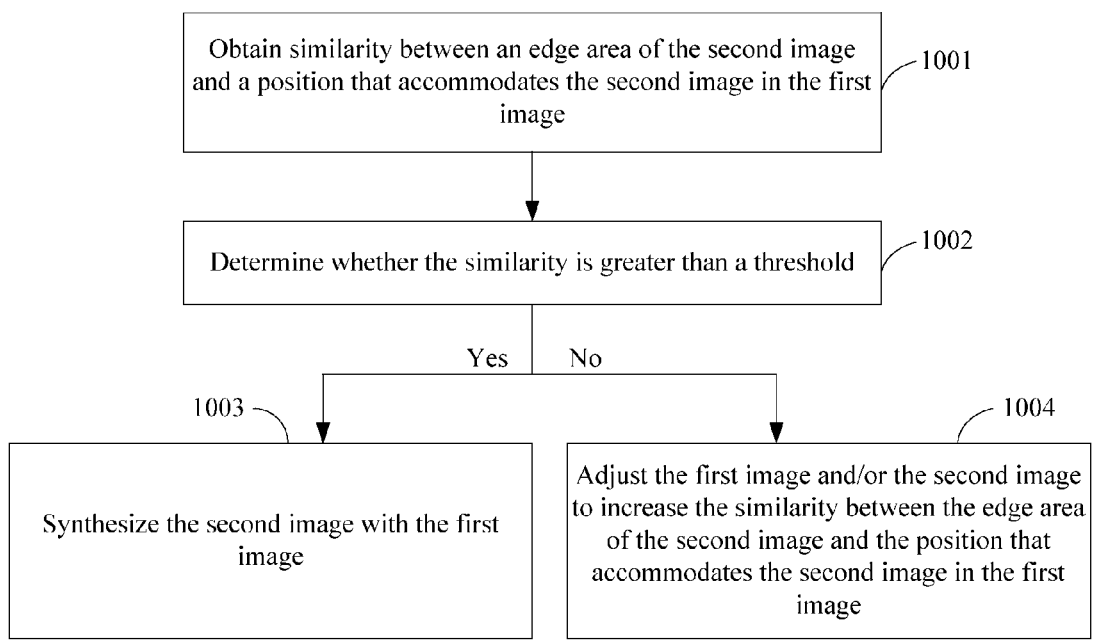
FIG. 10 is a flowchart of a method for processing a first image and a second image according to an embodiment of the present invention.

In another embodiment of the present invention, after the second image is displayed in the specified display area of the first image, as shown in FIG. 10, the method may further include the following steps:

Step 1001: Obtain similarity between an edge area of the second image and a position that accommodates the second image in the first image.

Specifically, characteristics such as color, edge, and texture in the edge area of the second image and those in the position that accommodates the second image in the first image may be obtained, and then the similarity between the characteristics is calculated.

Step 1002: Determine whether the similarity is greater than a threshold.

If the similarity is greater than the threshold, it indicates that the color and other characteristics at the edge of the second image are identical or similar to those in the position that accommodates the second image in the first image, and, in this case, step 1003 is executed; and, if the similarity is smaller than the threshold, the first image and the second image may be saved directly, or step 1004 may be executed.

Step 1003: Synthesize the second image with the first image.

This step may specifically be to adjust the hue, saturation, contrast, and brightness at the edge of the second image and in the position that accommodates the second image in the first image, so as to decrease the difference between the edge area of the second image and the first image, and then a display border of the second image is hidden or cancelled, and the second image and the first image are synthesized into one image.

Step 1004: Adjust the first image and/or the second image to increase the similarity between the edge area of the second image and the position that accommodates the second image in the first image.

Specifically, one or more parameters such as color, hue, saturation, contrast, brightness, curve, and color level of the first image and/or the second image may be adjusted to increase the similarity between the edge area of the second image and the position that accommodates the second image in the first image, so that the second image is displayed more naturally with a consistent style in the first image.

Further, an embodiment of the present invention provides another image processing method.

Figure 11:
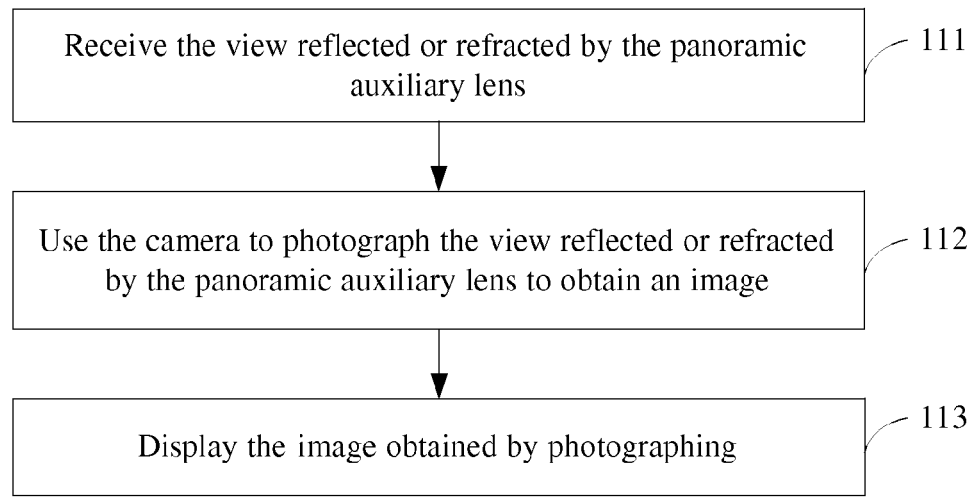
FIG. 11 is a flowchart of another image processing method according to an embodiment of the present invention.

Referring to FIG. 11, FIG. 11 is a flowchart of the other image processing method according to an embodiment of the present invention.

Figure 12:
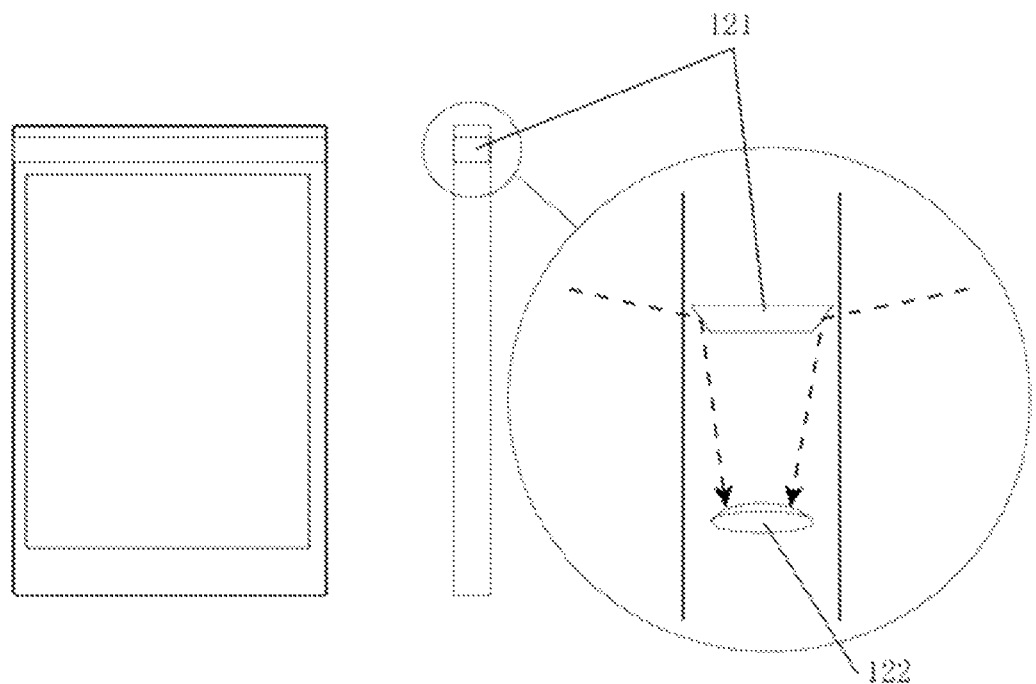
FIG. 12 is a schematic structural diagram of a terminal in an embodiment shown in FIG. 11.

In the embodiment of the present invention, as shown in FIG. 12, the terminal has a panoramic auxiliary lens 121 and at least one camera 122. The panoramic auxiliary lens 121 may be an annular reflection or refraction lens set on the terminal. The panoramic auxiliary lens 121 can reflect or refract a surrounding view of the terminal, where the surrounding view may be a 360-degree annular view centered on the terminal. The panoramic auxiliary lens 121 is in such a position relationship with the camera 122 that the panoramic auxiliary lens 121 can reflect or refract the surrounding view of the terminal to a photographing area of the camera 122. The method may include the following steps:

Step 111: Receive the view reflected or refracted by the panoramic auxiliary lens.

Depending on default settings, the terminal may enable a panoramic photographing function automatically when the user starts the photographing application. In this case, the panoramic auxiliary lens reflects or refracts the surrounding view to the camera, where the panoramic auxiliary lens is an annular reflection lens or refraction lens that reflects or refracts an annular view in a 360-degree scope to the camera.

Alternatively, when the user starts the photographing application, the terminal may display a variety of option information to the user, for example, information about a foreground mode, a background mode, a 360-degree full-frame mode, and the like. The foreground mode refers to activating only front view capturing on the terminal, where the default scale is 3:2, and user-defined adjustment may be performed according to user requirements in scenarios such as self-timer and video calls. The background mode refers to activating only rear view capturing on the terminal, where the default scale is 3:2 and user-defined adjustment may be performed according to user requirements in scenarios such as ordinary photographing and video recording of users. The 360-degree full-frame mode refers to activating 360-degree view finding and capturing, and using a panoramic auxiliary lens and a single camera to obtain a 360-degree panoramic image. According to the user's operation of selecting the 360-degree full-frame mode, the terminal receives an annular view reflected by the panoramic auxiliary lens.

Step 112: Use the camera to photograph the view reflected or refracted by the panoramic auxiliary lens to obtain an image.

The camera photographs the annular view reflected or refracted by the panoramic auxiliary lens to obtain a panoramic image, which may specifically be a 360-degree panoramic image centered on the terminal.

Step 113: Display the image obtained by photographing.

Figure 13A:
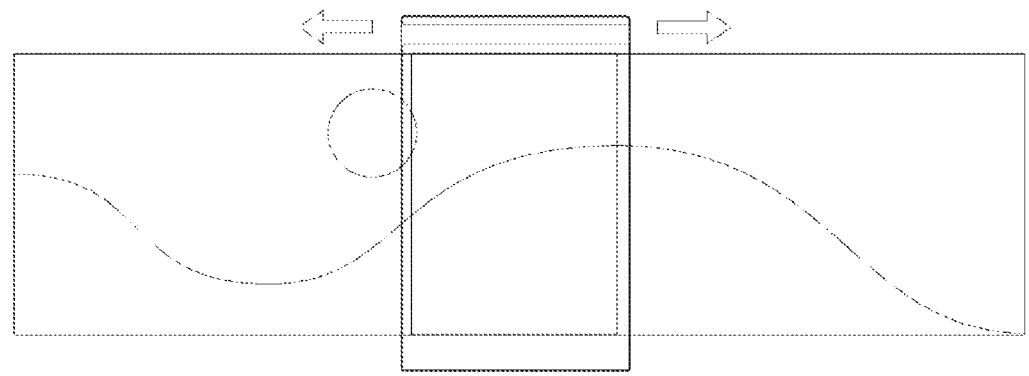
FIG. 13A is a schematic diagram of a first display mode of displaying a panoramic image according to an embodiment of the present invention.
Figure 13B:
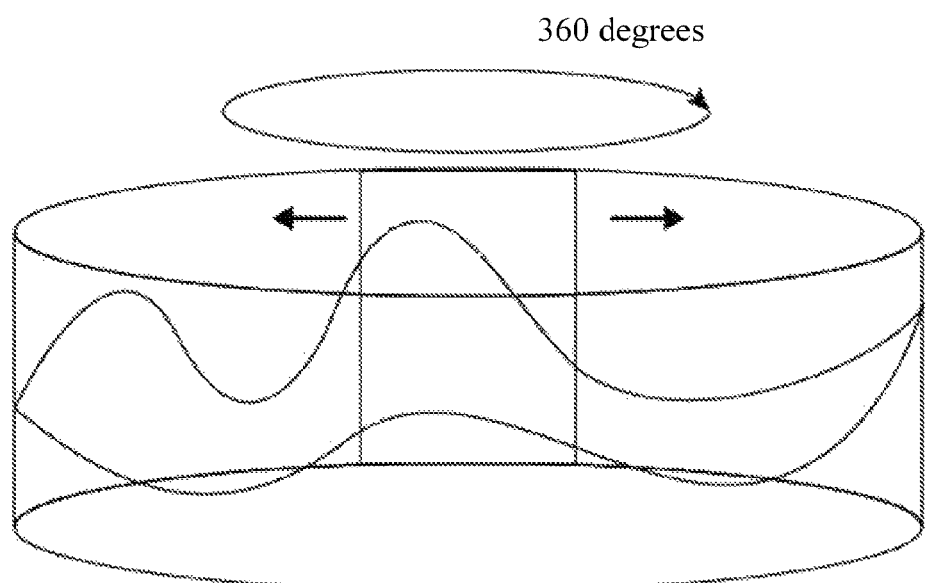
FIG. 13B is a schematic diagram of a second display mode of displaying a panoramic image according to an embodiment of the present invention.

The panoramic image may be displayed in multiple display manners, for example:

Manner 1: As shown in FIG. 13A, the obtained panoramic image may be displayed continuously in a planar expansion manner, or, as shown in FIG. 13B, the obtained panoramic image is displayed continuously in an annular manner, and the user can slide on the touch screen to browse the panoramic image continuously.

Figure 14:
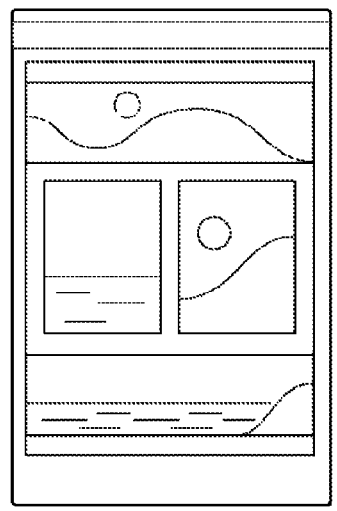
FIG. 14 is a schematic diagram of a third display mode of displaying a panoramic image according to an embodiment of the present invention.

Manner 2: The panoramic image may be divided into multiple images from different angles, and displayed in different positions on the display screen simultaneously. For example, as shown in FIG. 14, the image about a view in front of the terminal is displayed on the left side in the middle of the screen, and is the same as the image photographed by a traditional front camera of the terminal; the image about a view behind the terminal is displayed on the right side in the middle of the screen, and is the same as the image photographed by a traditional rear camera of the terminal; the image about a view in the 180-degree scope in front of the terminal is displayed on the top of the screen; and the image about a view in the 180-degree scope behind the terminal is displayed at the bottom of the screen. Nevertheless, other multiple images from different angles may be displayed.

In another embodiment of the present invention, before displaying the image obtained by photographing, the method may further include: if the image obtained by using camera to photograph the annular view reflected or refracted by the panoramic auxiliary lens is a non-planar image, processing the non-planar image into a planar image.

Figure 15:
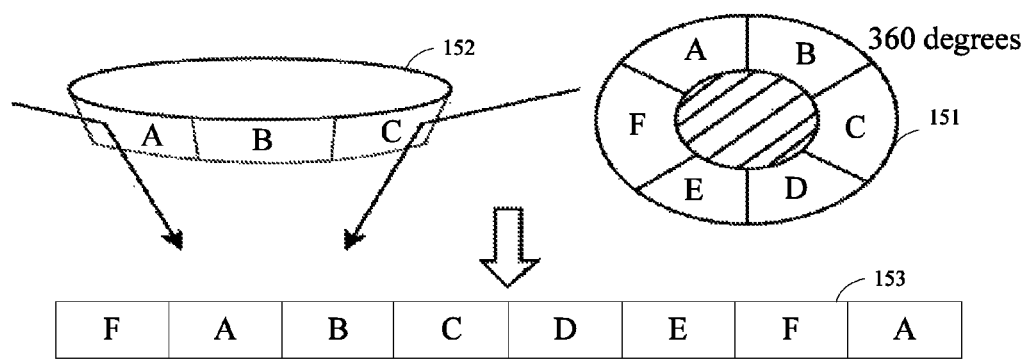
FIG. 15 is a schematic diagram of processing a photographed non-planar image according to an embodiment of the present invention.

As shown in FIG. 15, if the panoramic auxiliary lens 151 is a curved reflector, the view reflected by the reflector is also a curved view, and the image obtained by photographing is also a distorted curved image 152. In this step, by using an existing algorithm, the curved image 152 can be processed into a planar image 153, and then the planar image 153 is displayed.

Figure 16:
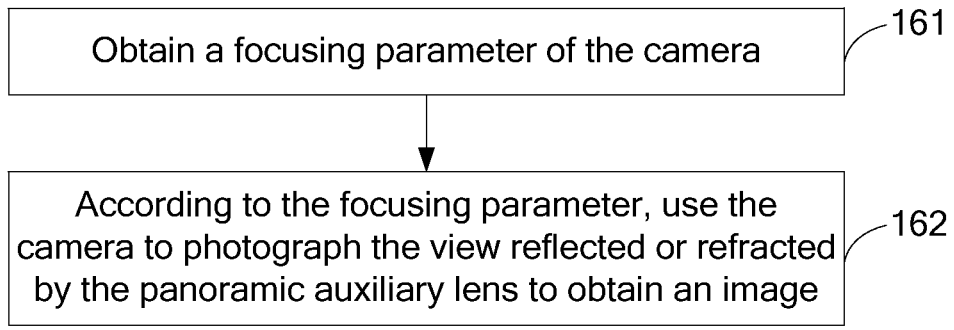
FIG. 16 is a method flowchart of using a camera to photograph a view reflected by a panoramic auxiliary lens to obtain an image according to an embodiment of the present invention.

In another embodiment of the present invention, as shown in FIG. 16, the process of using a camera to photograph an annular view reflected or refracted by a panoramic auxiliary lens to obtain an image may include the following steps:

Step 161: Obtain a focusing parameter of the camera.

The focusing parameter may be a focusing parameter obtained by the camera in a default automatic focusing manner; or may be a focusing parameter input by the user manually and obtained by the terminal after the user inputs the parameter manually or adjusts a focus manually.

The obtaining, by the terminal, a focusing parameter input by the user manually may include: first, using the camera to obtain a preview image of the view reflected or refracted by the panoramic auxiliary lens, where the preview image includes multiple preview sub-images from different angles, where the multiple preview sub-images in the preview image may be distributed in a manner shown in FIG. 14; and then determining a focusing parameter of the camera according to the user's operation of adjusting a focus for any preview sub-image of the multiple preview sub-images.

In the preview image displayed in the manner shown in FIG. 14, the user may adjust the focus for a preview image from one angle manually to determine the focusing parameter of the camera. According to the user's operation of adjusting the focus for the preview image from one angle, the terminal may update the preview images from other angles in real time after the focus is adjusted.

No matter in which manner to obtain the focusing parameter, at the time of determining the focusing parameter, the preference order of a focusing target based on which the focusing parameter is determined may be: in the display manner shown in FIG. 14, the preview image of the rear view (on the right side in the middle of FIG. 14) is a first choice, the preview image of the front view (on the left side in the middle of FIG. 14) is a second choice, the preview image of the 180-degree rear view (on the top of FIG. 14) is a third choice, and the preview image of the 180-degree front view (at the bottom of FIG. 14) is a last choice.

Step 162: According to the focusing parameter, use the camera to photograph the annular view reflected or refracted by the panoramic auxiliary lens to obtain an image.

Figure 17A:
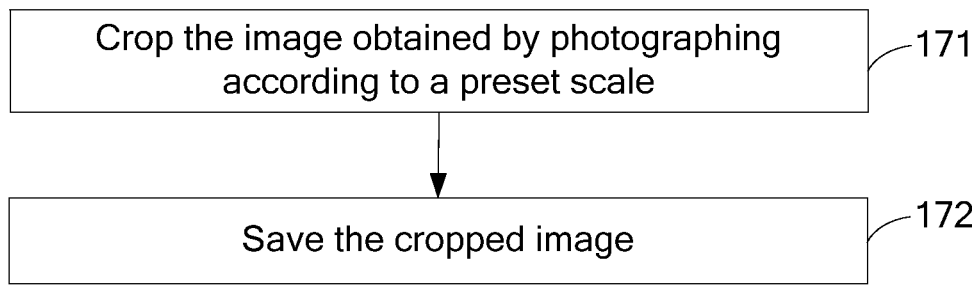
FIG. 17A is a flowchart of a method for processing a image obtained by photographing according to an embodiment of the present invention.

In another embodiment of the present invention, after the image obtained by photographing is displayed, as shown in FIG. 17A, the image processing method may further include:

Step 171: Crop the image obtained by photographing according to a preset scale.

Figure 17B:
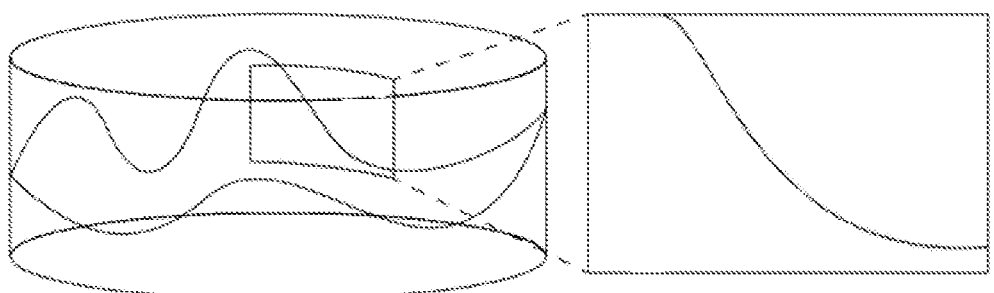
FIG. 17B is a schematic diagram of cropping an image obtained by photographing in an embodiment shown in FIG. 17A.

Specifically, the 360-degree view may be cropped according to any scale (for example, a scale determined by the user by dragging a cutting box) or a template scale (for example, 3:2 as landscape to portrait, 4:3 as landscape to portrait, 16:9 as landscape to portrait, 1:1, and the like). As shown in FIG. 17B, the cropped view can be flattened automatically according to an algorithm and then saved.

Step 172: Save the cropped image.

Nevertheless, the 360-degree view may also be saved directly without cropping.

The embodiment of the present invention is applicable to a digital camera, a digital video camera, or even a professional camera, in order to implement capturing of more information, and may be applied in scenarios such as television, movies, or even the game field, for example, interactive programs and interactive movies may be recorded and launched. The user can rotate to watch other different corners during watching, and can wear a device on the head to implement real four-dimensional (4D) experience. In the business field, the embodiment of the present invention may be integrated into a telepresence conference system. In a scenario such as demonstration or conference, a full-frame conference that surpasses the current telepresence system can be implemented.

The above description deals with method embodiments of the present invention, and the following introduces an apparatus for implementing the method.

Figure 18:
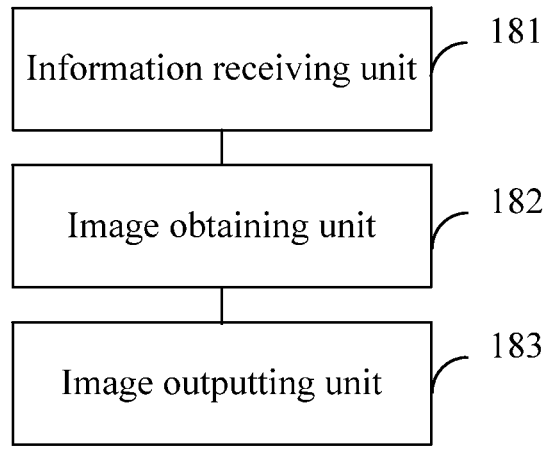
FIG. 18 is a schematic structural diagram of an image processing apparatus according to an embodiment of the present invention.

Referring to FIG. 18, FIG. 18 is a schematic structural diagram of an image processing apparatus according to an embodiment of the present invention.

The apparatus may include: an information receiving unit 181 configured to receive information of starting a first camera and a second camera simultaneously to perform photographing; an image obtaining unit 182 configured to use the first camera to photograph and obtain a first image, and use the second camera to photograph and obtain a second image; and an image outputting unit 183 configured to display the first image and the second image simultaneously.

In the embodiment of the present invention, the foregoing unit in the apparatus starts two cameras simultaneously to perform bidirectional photographing, and simultaneously displays the images taken by both cameras, so that front and back scene images are captured simultaneously and a panoramic image is obtained.

Figure 19:
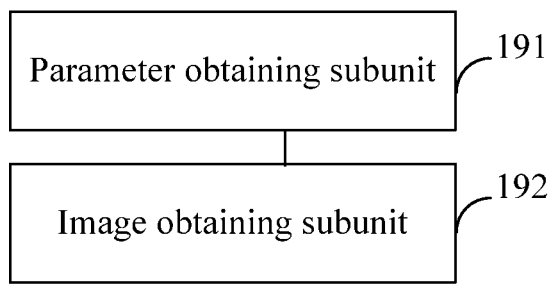
FIG. 19 is a schematic structural diagram of an image obtaining unit according to an embodiment of the present invention.

In another embodiment, as shown in FIG. 19, the image obtaining unit may further include: a parameter obtaining subunit 191 configured to obtain a first focusing parameter of the first camera and a second focusing parameter of the second camera; and an image obtaining subunit 192 configured to use the first camera to photograph according to the first focusing parameter to obtain the first image, and use the second camera to photograph according to the second focusing parameter to obtain the second image. In another embodiment, the parameter obtaining subunit 191 may further include: a first subunit configured to use the first camera to obtain a preview image of the first image; and a second subunit configured to determine the first focusing parameter of the first camera according to an operation of adjusting the focus for the preview image of the first image.

Figure 20:
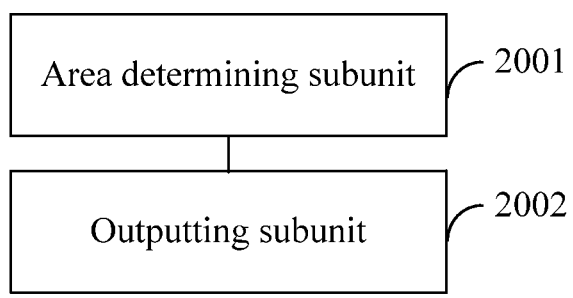
FIG. 20 is a schematic structural diagram of an image inputting unit according to an embodiment of the present invention.

In another embodiment of the present invention, as shown in FIG. 20, the image inputting unit may further include: an area determining subunit 2001 configured to determine a specified display area of the second image in the first image; and an outputting subunit 2002 configured to display the second image in the specified display area of the first image.

The area determining subunit 2001 may further include: a third subunit configured to determine a prominent area and a non-prominent area in the first image according to a preset algorithm; and a fourth subunit configured to use the non-prominent area in the first image as the specified display area of the second image in the first image.

In another embodiment of the present invention, the image processing apparatus may further include: a locus obtaining unit configured to obtain a drag locus of the second image; and a position determining unit configured to determine a display position of the second image according to the drag locus.

In another embodiment of the present invention, the image processing apparatus may further include: an information obtaining unit configured to obtain information about switching operations on display areas of the first image and the second image; and a switching unit configured to exchange the display areas of the first image and the second image according to the information about the switching operation.

In another embodiment of the present invention, the image processing apparatus may further include: a calculating unit configured to obtain similarity between an edge area of the second image and a position that accommodates the second image in the first image; a synthesizing unit configured to synthesize the second image with the first image if the similarity is greater than or equal to a threshold; and an adjusting unit configured to adjust the first image and/or the second image to increase the similarity if the similarity is smaller than the threshold.

Figure 21:
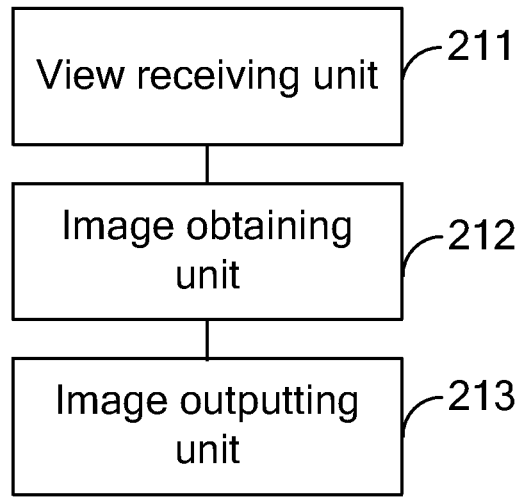
FIG. 21 is a schematic structural diagram of another image processing apparatus according to an embodiment of the present invention.

FIG. 21 is a schematic structural diagram of another image processing apparatus according to an embodiment of the present invention.

The apparatus is applied to a terminal that has a panoramic auxiliary lens and at least one camera, where the panoramic auxiliary lens is used to reflect or refract a surrounding view of the terminal to a photographing area of the camera, and the apparatus includes: a view receiving unit 211 configured to receive the view reflected or refracted by the panoramic auxiliary lens; an image obtaining unit 212 configured to use the camera to photograph the view reflected or refracted by the panoramic auxiliary lens to obtain an image; and an image outputting unit 213 configured to display the image obtained by photographing.

The image outputting unit 213 may be specifically configured to: display the image obtained by photographing continuously in a planar expansion manner; or display the image obtained by photographing continuously in an annular display manner; or divide the image obtained by photographing into multiple images from different angles, and display the multiple images from different angles simultaneously.

In the embodiment of the present invention, the apparatus can use the units to capture front and back scene images simultaneously and obtain a panoramic image.

In another embodiment of the present invention, the image obtaining unit may further include: a preview subunit configured to use the camera to obtain a preview image of the view reflected or refracted by the panoramic auxiliary lens, where the preview image includes multiple preview sub-images from different angles; a parameter determining subunit configured to determine a focusing parameter of the camera according to an operation of adjusting the focus for any preview sub-image of the multiple preview sub-images; and an obtaining subunit configured to: according to the focusing parameter, use the camera to photograph the view reflected or refracted by the panoramic auxiliary lens to obtain an image.

In another embodiment of the present invention, the apparatus may further include: a cropping unit configured to crop the image obtained by photographing according to a set scale; and a saving unit configured to save the cropped image.

Figure 22:
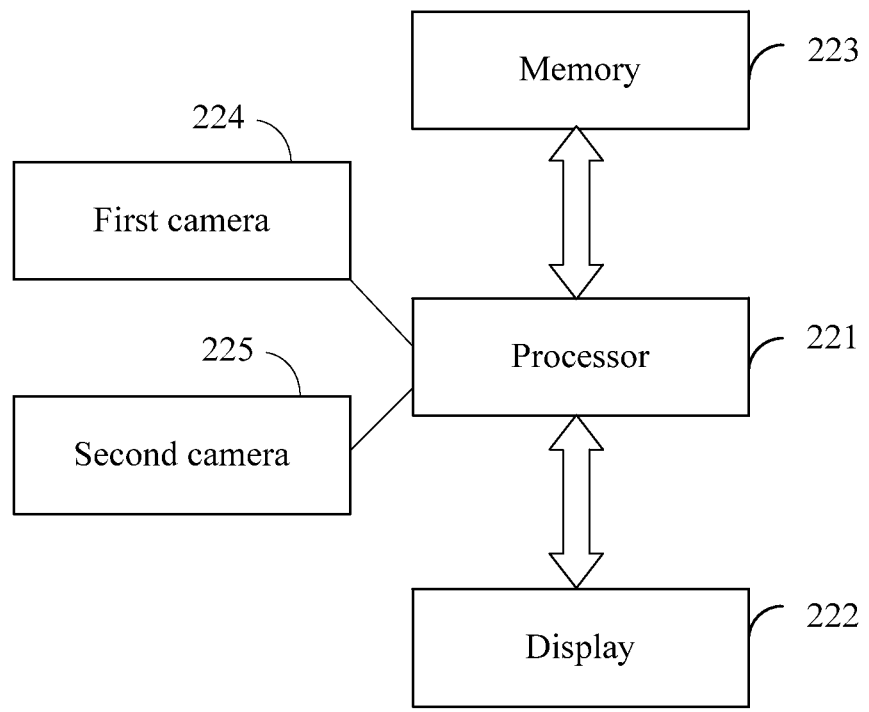
FIG. 22 is a schematic structural diagram of a terminal according to an embodiment of the present invention.

Referring to FIG. 22, FIG. 22 is a schematic structural diagram of a terminal according to an embodiment of the present invention.

The terminal may include a processor 221, a display 222, a memory 223, a first camera 224, and a second camera 225, where the processor 221 is configured to control working states of the first camera 224 and the second camera 225, the processor 221 is connected to the display 222 and the memory 223 respectively, the memory 223 stores a set of program codes, and the processor 221 is configured to call the program codes stored in the memory to execute the following operations: receiving information of starting the first camera 224 and the second camera 225 simultaneously to perform photographing; using the first camera 224 to photograph and obtain a first image, and using the second camera 225 to photograph and obtain a second image; and the display 222 is configured to display the first image and the second image simultaneously.

In the embodiment of the present invention, the terminal starts two cameras simultaneously to perform bidirectional photographing, and simultaneously displays the images taken by both cameras, so that front and back scene images are captured simultaneously and a panoramic image is obtained.

Figure 23:
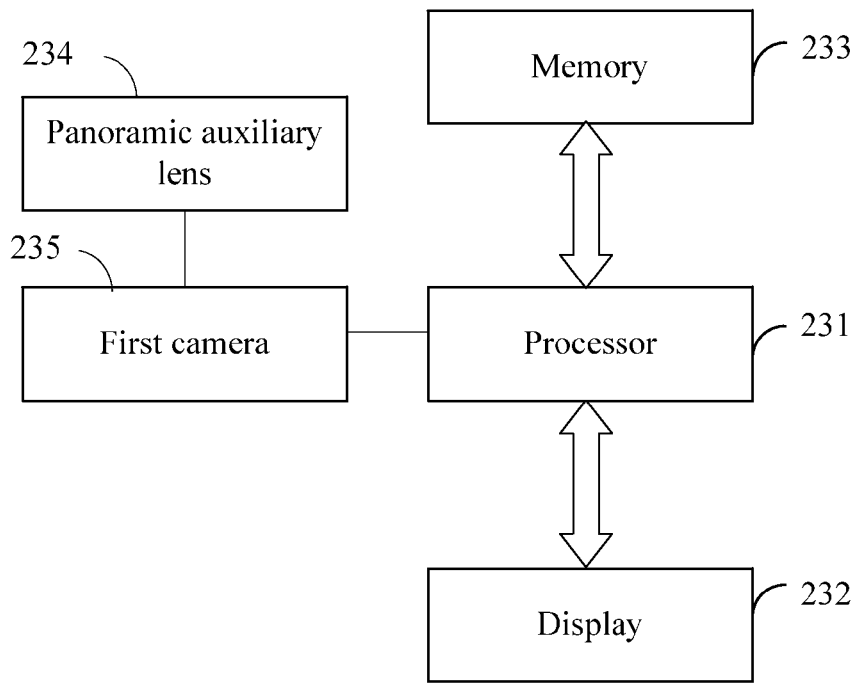
FIG. 23 is a schematic structural diagram of another terminal according to an embodiment of the present invention.

FIG. 23 is a schematic structural diagram of another terminal according to an embodiment of the present invention.

The terminal may include a processor 231, a display 232, a memory 233, a panoramic auxiliary lens 234, and at least one camera 235, where the processor 231 is configured to control a working state of the camera 235, the panoramic auxiliary lens 234 is configured to reflect or refract a surrounding view of the terminal to a photographing area of the camera 235, the processor 231 is connected to the display 232 and the memory 233 respectively, the memory 233 stores a set of program codes, and the processor 231 is configured to call the program codes stored in the memory 233 to execute the following operations: receiving the view reflected or refracted by the panoramic auxiliary lens 234; using the camera 235 to photograph the view reflected or refracted by the panoramic auxiliary lens 233 to obtain an image; and the display 232 is configured to display the image obtained by photographing.

In the embodiment of the present invention, the terminal uses a panoramic auxiliary lens and a single camera to capture front and back scene images simultaneously and obtain a panoramic image.

Figure 24:
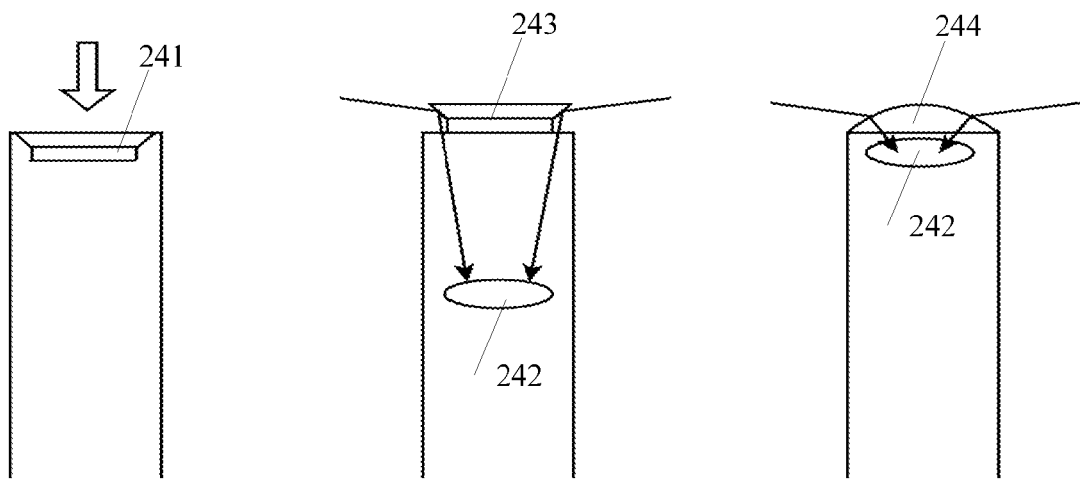
FIG. 24 is a schematic structural diagram of a panoramic auxiliary lens according to an embodiment of the present invention.

In another embodiment of the present invention, as shown in FIG. 24, the panoramic auxiliary lens 241 may be located on top of the terminal and connected resiliently to the top of the terminal, and, while working, the panoramic auxiliary lens 241 are in an pop-up state to reflect or refract a surrounding view of the terminal to a photographing area of the camera 242. The panoramic auxiliary lens 241 may specifically be an annular convex lens 243 or a fisheye lens 244. The fisheye lens is a lens with a very short focal length (such as 16 mm or a shorter focal length) and an angle close to or equal to 180°, and is an extreme wide-angle lens.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected to achieve the objective of the solution of the embodiment according to actual needs.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) or a processor to perform all or a part of the steps of the methods described in the embodiments of the present invention. The foregoing storage medium includes any mediums that can store program codes, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image processing method, comprising:
   receiving information of starting a first camera and a second camera simultaneously to perform photographing;
   obtaining a first focusing parameter for the first camera and a second focusing parameter for the second camera;
   using the first camera to photograph and obtain a first image according to the first focusing parameter;
   using the second camera to photograph and obtain a second image according to the second focusing parameter;
   obtaining a similarity between an edge area of the second image and a position that accommodates the second image in the first image;
   synthesizing the second image with the first image when the similarity is greater than or equal to a threshold, wherein synthesizing the second image with the first image comprises adjusting the edge area of the second image and the position that accommodates the second image in the first image to decrease a difference between the edge area of the second image and the position that accommodates the second image in the first image, and wherein synthesizing the second image with the first image comprises adjusting hue, saturation, contrast, and brightness at the edge area of the second image and the position that accommodates the second image in the first image;
   adjusting one of the first image and the second image when the similarity is less than the threshold, wherein adjusting the one of the first image and the second image comprises adjusting the one of the first image and the second image to increase the similarity between the edge area of the second image and the position that accommodates the second image in the first image, and wherein adjusting the one of the first image and the second image comprises adjusting color, hue, saturation, contrast, curve, and color level of the one of the first image and the second image; and
   displaying the first image and the second image simultaneously.

2. The method according to claim 1, wherein obtaining the first focusing parameter for the first camera comprises:
   using the first camera to obtain a preview image of the first image; and
   determining the first focusing parameter of the first camera according to an operation of adjusting a focus for the preview image for the first image.

3. The method according to claim 1, wherein displaying the first image and the second image simultaneously comprises:
   determining a specified display area of the second image in the first image; and
   displaying the second image in the specified display area of the first image.

4. The method according to claim 3, wherein determining the specified display area of the second image in the first image comprises:
   determining a prominent area and a non-prominent area in the first image according to a preset algorithm; and
   using the non-prominent area in the first image as the specified display area of the second image in the first image.

5. The method according to claim 3, wherein after displaying the first image and the second image simultaneously, the method further comprises:
   obtaining a drag locus of the second image; and
   determining a display position of the second image according to the drag locus.

6. The method according to claim 3, wherein after displaying the first image and the second image simultaneously, the method further comprises:
   obtaining information about switching operations on display areas of the first image and the second image; and
   exchanging the display areas of the first image and the second image according to the information about the switching operations.

7. An image processing apparatus, comprising:
   an information receiving unit configured to receive information of starting a first camera and a second camera simultaneously to perform photographing;
   an image obtaining unit configured to use the first camera to photograph and obtain a first image, and use the second camera to photograph and obtain a second image, wherein the image obtaining unit comprises a parameter obtaining subunit and an image obtaining subunit, wherein the parameter obtaining subunit is configured to obtain a first focusing parameter for the first camera and a second focusing parameter for the second camera, and wherein the image obtaining subunit is configured to use the first camera to photograph according to the first focusing parameter to obtain the first image, and use the second camera to photograph according to the second focusing parameter to obtain the second image;
   a calculating unit configured to obtain a similarity between an edge area of the second image and a position that accommodates the second image in the first image, wherein the calculating unit is configured to obtain the similarity by calculating similarities between color, edge, and texture of the edge area of the second image and the position that accommodates the second image in the first image;
   a synthesizing unit configured to synthesize the second image with the first image when the similarity is greater than or equal to a threshold, wherein the second image is synthesized with the first image comprises adjusting the edge area of the second image and the position that accommodates the second image in the first image to decrease a difference between the edge area of the second image and the position that accommodates the second image in the first image, and wherein the synthesizing unit is configured to synthesize the second image with the first image by adjusting hue, saturation, contrast, and brightness at the edge area of the second image and the position that accommodates the second image in the first image;
   an adjusting unit configured to adjust one of the first image and the second image when the similarity is less than the threshold, wherein the one of the first image and the second image is adjusted comprises adjusting the one of the first image and the second image to increase the similarity between the edge area of the second image and the position that accommodates the second image in the first image, and wherein the adjusting unit is configured to adjust color, hue, saturation, contrast, curve, and color level of the one of the first image and the second image; and
   an image outputting unit configured to display the first image and the second image simultaneously.

8. The apparatus according to claim 7, wherein the parameter obtaining subunit comprises:
   a first subunit configured to use the first camera to obtain a preview image of the first image; and a second subunit configured to determine the first focusing parameter for the first camera according to an operation of adjusting a focus for the preview image of the first image.

9. The apparatus according to claim 7, wherein the image outputting unit comprises:
an area determining subunit configured to determine a specified display area of the second image in the first image; and
an outputting subunit configured to display the second image in the specified display area of the first image.

10. The apparatus according to claim 9, wherein the area determining subunit comprises:
a third subunit configured to determine a prominent area and a non-prominent area in the first image according to a preset algorithm; and
a fourth subunit configured to use the non-prominent area in the first image as the specified display area of the second image in the first image.

11. The apparatus according to claim 9, further comprising:
a locus obtaining unit configured to obtain a drag locus of the second image; and
a position determining unit configured to determine a display position of the second image according to the drag locus.

12. The apparatus according to claim 9, further comprising:
an information obtaining unit configured to obtain information about switching operations on display areas of the first image and the second image; and
a switching unit configured to exchange the display areas of the first image and the second image according to the information about the switching operations.

13. A non-transitory computer-readable medium having computer usable instructions stored thereon for execution by a processor, wherein the instructions cause the processor to:
receive information of starting a first camera and a second camera simultaneously to perform photographing;
obtain a first focusing parameter for the first camera and a second focusing parameter for the second camera;
use the first camera to photograph and obtain a first image according to the first focusing parameter;
use the second camera to photograph and obtain a second image according to the second focusing parameter;
obtain a similarity between an edge area of the second image and a position that accommodates the second image in the first image, wherein the similarity is obtained by calculating similarities between color, edge, and texture of the edge area of the second image and the position that accommodates the second image in the first image;
synthesize the second image with the first image when the similarity is greater than or equal to a threshold, wherein the second image is synthesized with the first image comprises adjusting the edge area of the second image and the position that accommodates the second image in the first image to decrease a difference between the edge area of the second image and the position that accommodates the second image in the first image, and wherein the second image is synthesized with the first image by adjusting hue, saturation, contrast, and brightness at the edge area of the second image and the position that accommodates the second image in the first image;
adjust one of the first image and the second image when the similarity is less than the threshold, wherein the one of the first image and the second image is adjusted comprises adjusting the one of the first image and the second image to increase the similarity between the edge area of the second image and the position that accommodates the second image in the first image, and wherein the one of the first image and the second image is adjusted by adjusting color, hue, saturation, contrast, curve, and color level of the one of the first image and the second image; and
display the first image and the second image simultaneously.

14. The non-transitory computer-readable medium according to claim 13, wherein the instructions which cause the processor to obtain the first focusing parameter for the first camera comprises instructions causing the processor to:
use the first camera to obtain a preview image of the first image; and
determine the first focusing parameter for the first camera according to an operation of adjusting a focus for the preview image of the first image.

15. The non-transitory computer-readable medium according to claim 13, wherein the instructions which cause the processor to display the first image and the second image simultaneously comprises instructions causing the processor to:
determine a specified display area of the second image in the first image; and
display the second image in the specified display area of the first image.

16. The non-transitory computer-readable medium according to claim 15, wherein the instructions which cause the processor to determine the specified display area of the second image in the first image comprises instructions causing the processor to:
determine a prominent area and a non-prominent area in the first image according to a preset algorithm; and
use the non-prominent area in the first image as the specified display area of the second image in the first image.

17. The non-transitory computer-readable medium according to claim 15, wherein after the instructions cause the processor to display the first image and the second image simultaneously, the instructions further cause the processor to:
obtain a drag locus of the second image; and
determine a display position of the second image according to the drag locus.

18. The non-transitory computer-readable medium according to claim 15, wherein after the instructions cause the processor to display the first image and the second image simultaneously, the instructions further cause the processor to:
obtain information about switching operations on display areas of the first image and the second image; and
exchange the display areas of the first image and the second image according to the information about the switching operations.

19. The method according to claim 1, wherein obtaining the first focusing parameter for the first camera and the second focusing parameter for the second camera comprises:
simultaneously displaying a preview image of the first image and a preview image of the second image;
receiving a first user input for adjusting focus of the preview image of the first image;
receiving a second user input for adjusting focus of the preview image of the second image;
determining the first focusing parameter according to the first user input; and
determining the second focusing parameter according to the second user input.

20. The method according to claim 1, wherein obtaining the first focusing parameter for the first camera and the second focusing parameter for the second camera comprises obtaining the first focusing parameter and the second focusing parameter through auto-focus.

21. The apparatus according to claim 7, wherein the parameter obtaining subunit is configured to obtain the first focusing parameter for the first camera and the second focusing parameter for the second camera by:

receiving a first user input for adjusting focus of a preview image of the first image;

receiving a second user input for adjusting focus of a preview image of the second image;

determining the first focusing parameter according to the first user input; and determining the second focusing parameter according to the second user input.

22. The apparatus according to claim 7, wherein the parameter obtaining subunit is configured to obtain the first focusing parameter for the first camera and the second focusing parameter for the second camera through auto-focus.

23. The non-transitory computer readable medium according to claim 13, wherein the instructions which cause the processor to obtain the first focusing parameter for the first camera and the second focusing parameter for the second camera comprises instructions causing the processor to:

simultaneously display a preview image of the first image and a preview image of the second image;

receive a first user input for adjusting focus of the preview image of the first image;

receive a second user input for adjusting focus of the preview image of the second image;

determine the first focusing parameter according to the first user input; and determine the second focusing parameter according to the second user input.

24. The non-transitory computer readable medium according to claim 13, wherein the instructions which cause the processor to obtain the first focusing parameter for the first camera and the second focusing parameter for the second camera comprises instructions causing the processor to obtain the first focusing parameter and the second focusing parameter through auto-focus.

25. The method according to claim 1, wherein obtaining the similarity between the edge area of the second image and the position that accommodates the second image in the first image comprises calculating similarities between color, edge, and texture of the edge area of the second image and the position that accommodates the second image in the first image.

26. The method according to claim 4, wherein the preset algorithm comprises a space-based distribution algorithm that divides the first image into prominent areas, medium-level areas, and non-prominent areas.

* * * * *